Nov. 19, 1963 J. R. OISHEI 3,111,184
VEHICLE DOOR LOCKING SYSTEM WITH VACUUM
AND AIR PRESSURE LOCK OPERATING MEANS
Filed Feb. 3, 1960 2 Sheets-Sheet 1
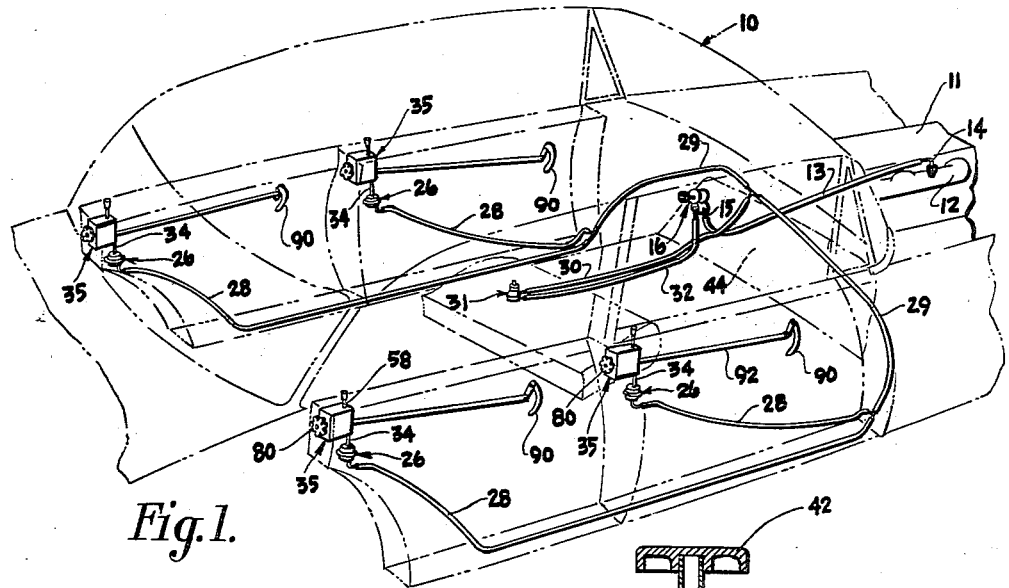
Fig.1.
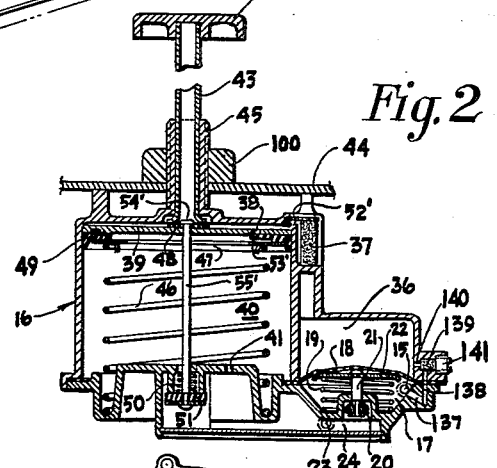
Fig.2
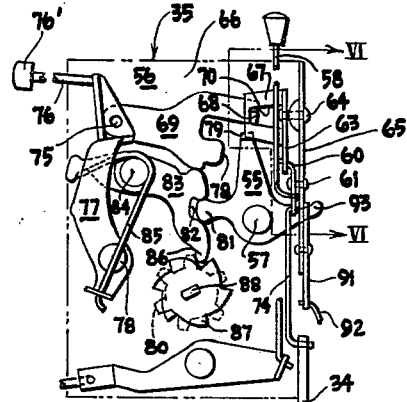
Fig.5
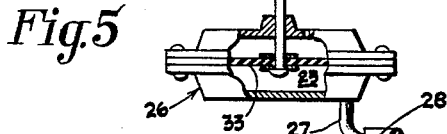
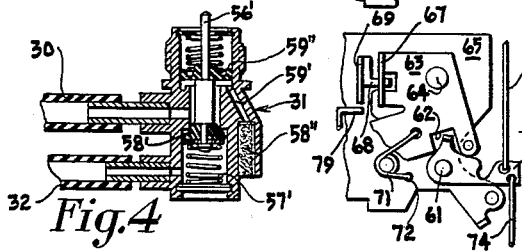
Fig.4
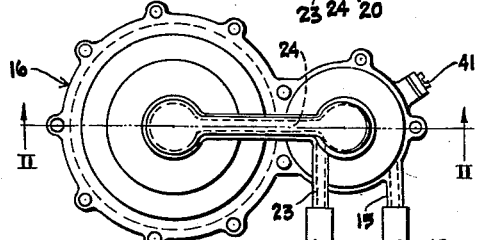
Fig.3
Fig.6
INVENTOR.
JOHN R. OISHEI
BY
Bean Brooks Buckley & Bean.
ATTORNEYS

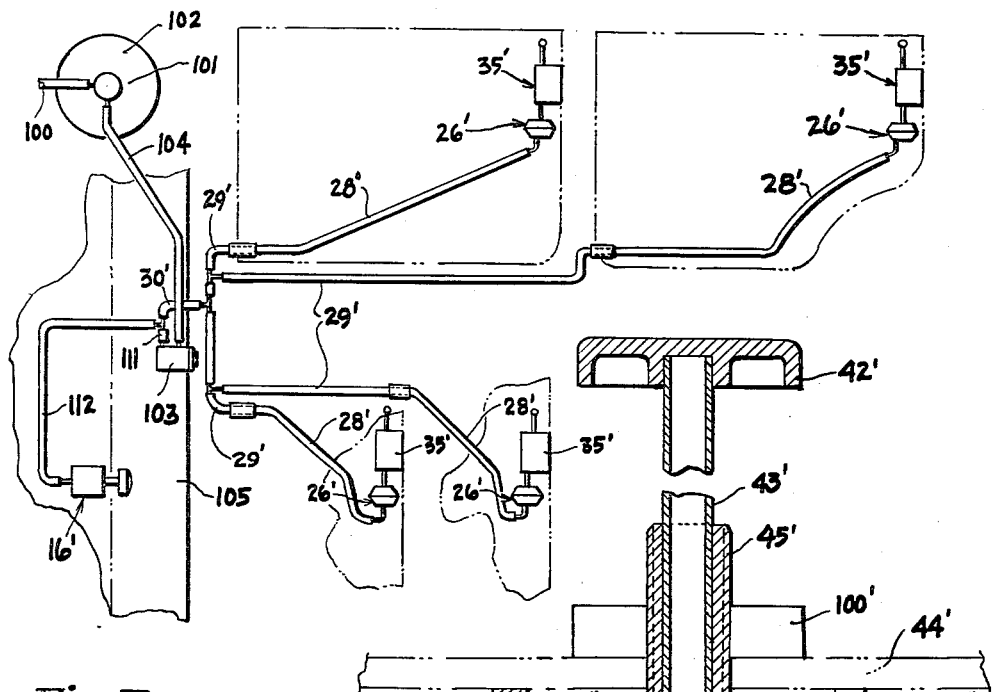
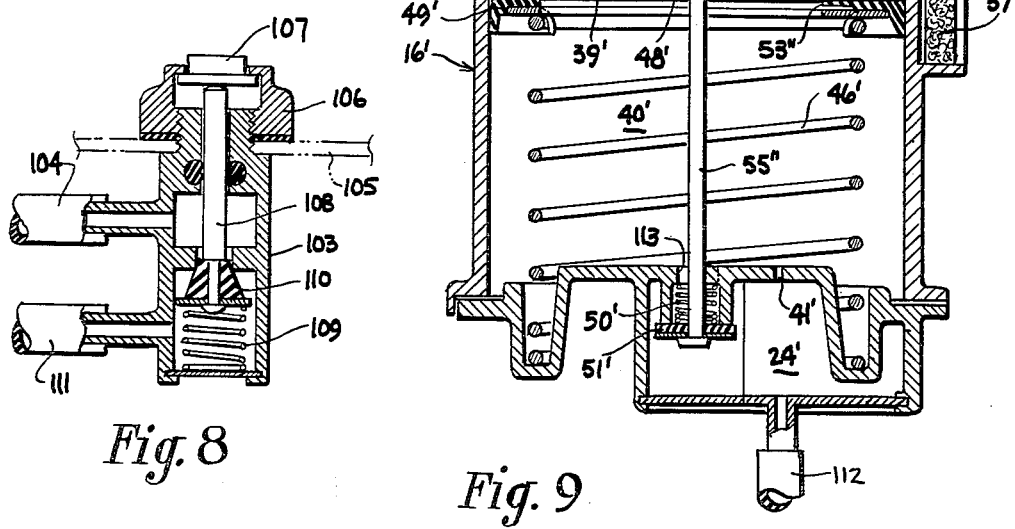
Fig. 7
Fig. 8
Fig. 9
INVENTOR.
JOHN R. OISHEI
BY
Bean Brooks Buckley & Bean.
ATTORNEYS

United States Patent Office 3,111,184
Patented Nov. 19, 1963

3,111,184
VEHICLE DOOR LOCKING SYSTEM WITH VACUUM AND AIR PRESSURE LOCK OPERATING MEANS
John R. Oishei, Buffalo, N.Y., assignor to Trico Products Corporation, Buffalo, N.Y.
Filed Feb. 3, 1960, Ser. No. 6,501
3 Claims. (Cl. 180—82)

The present invention relates to an improved door locking system for an automotive vehicle.

It is one object of the present invention to provide a door locking system for an automotive vehicle which produces automatic locking of the vehicle doors incidental to the normal operation of the vehicle, and which permits selective remote unlocking of all of the doors from within the vehicle without relying in any way on the source of energy which is utilized for effecting automatic locking, thereby permitting remote unlocking to be effected by the vehicle operator at any time without reliance on the vehicle operating mechanism to provide an energy source.

It is another object of the present invention to provide a door locking system for an automotive vehicle which not only effects automatic locking of all of the vehicle doors incidental to the normal operation of the vehicle and which permits remote unlocking of the vehicle doors, as described above, but also effects all of the foregoing by the use of relatively few parts, thereby providing a system which can be produced and installed at a low cost.

It is another object of the present invention to provide a fluid pressure manual remote lock actuating system for an automotive vehicle wherein all of the vehicle doors may be selectively locked from a remote position and may also be selectively unlocked from a remote position through a single fluid pressure conduit, as desired, and the unlocking may be effected without using any portion of the vehicle operating mechanism as a source of energy.

It is a still further object of the present invention to provide a door locking system for an automotive vehicle wherein the mechanism for effecting automatic locking of the vehicle doors in no way interferes with the manual remote unlocking thereof notwithstanding that both the locking and unlocking are effected through a single fluid pressure conduit coupled to a motor which actuates the door lock. Other objects and attendant advantages of the present invention will readily be perceived hereafter.

In accordance with the present invention, an automatic selector or control valve is coupled to the engine intake manifold of an automotive vehicle by means of a single conduit. This automatic selector valve is, in turn, also coupled by a single conduit to each of a plurality of fluid pressure motors associated with each of the latch locks in the vehicle doors. In response to the normal operation of the vehicle engine, the selector or control valve permits communication between the engine intake manifold and each of the door locking motors through the above-mentioned single conduit connections to thereby effect automatic locking of the vehicle doors. After a period of communication of the door locking motors with the vacuum source, valve means within the selector or control valve may automatically terminate this communication, and the negative pressure in the door locking motors is equalized with the atmosphere through a suitable venting arrangement. Thereafter the vehicle doors may be unlocked from within the vehicle by the manipulation of the inside door handles, or the like, without interference from a holding force exerted on the door locks by the door locking motors. However, the door locks possess structure which prevents the doors from being unlocked by the normal manipulation of the outside door handles after the doors have once been locked. In the event that it is desired to unlock all of the vehicle doors simultaneously from a remote position within the vehicle, it is merely necessary for the vehicle operator to actuate a pump preferably with his foot. This pump, upon actuation, supplies fluid under positive pressure which may communicate with the single conduits connected to the door lock actuating motors through a valve arrangement which is opened only when the pump is actuated but which remains closed during the automatic engine power actuation of the door locks to a locked condition. It can readily be seen that the negative pressure produced by the engine intake manifold actuates the door locking motors in a first direction when it communicates with said motors through said single hose conduit. On the other hand, the positive pressure, produced by the preferably foot-actuated pump, in the same single conduit causes the motors to be actuated in an opposite direction for unlocking the vehicle doors. It can thus be seen that an arrangement is provided for exerting a positive force on door locking motors either by the use of a negative pressure or a positive pressure to thereby alternately provide prompt, positive locking or unlocking of the vehicle doors, and further that the alternate source of pressure for effective unlocking is independent of any power resulting from the operation of the vehicle and therefore always available even though power from the vehicle operation is not available. An alternate embodiment of the present invention is generally similar to the above described embodiment in all respects except that the locking of the vehicle doors is effected in response to manual actuation rather than automatically, as described above. Otherwise, the manually actuated system has all of the advantages of the automatic system. The present invention will be more fully understood when the following portions of the specification are read in conjunction with the accompanying drawings wherein:

FIG. 1 is a fragmentary perspective view of an automotive vehicle containing the improved door locking system of the present invention; FIG. 2 is a view, partly in cross section, taken along line II—II of FIG. 3 and showing a combined pumping unit and automatic selector or control valve for effecting remote manual door unlocking and automatic door locking, respectively; FIG. 3 is a bottom plan view of the control or selector valve shown in FIG. 2; FIG. 4 is a view, partly in cross section, of a deactuator valve used in the system of FIG. 1; FIG. 5 is a view of the internal lock mechanism associated with the vehicle doors; FIG. 6 is a view taken along line VI—VI of FIG. 5; FIG. 7 is a schematic representation of an alternate embodiment of the present invention which depends on manual actuation for both locking and unlocking; FIG. 8 is a view, partly in cross section, of the switch used in the system of FIG. 7; and FIG. 9 is a view of the pump unit used in the embodiment of FIG. 7.

In FIG. 1 automotive vehicle 10 is shown having engine 11 therein. The intake manifold 12 of engine 11 is connected to single conduit 13 by means of fitting 14. The end of single conduit 13, which is remote from manifold 12, is coupled to nipple 15 (FIG. 3) of combined selector or control valve and pump unit 16.

Incidental to the starting of the vehicle engine, the creation of vacuum in manifold 12 will cause the evacuation of chamber 17 of unit 16 because nipple 15 communicates with said chamber. This will cause flexible diaphragm 18 to be pulled downwardly against the bias of spring 19. The downward movement of diaphragm 18 will be accompanied by a movement of valve 20, mounted on stem 21 affixed to plate 22 which is transposed between diaphragm 18 and spring 19. When poppet valve 20 is unseated in this manner, nipple 15 will be in communication with nipple 23 through chambers 17 and 24. Because of this valve action, chamber 25 (FIG. 5) of each door locking motor 26 will be evacuated through nipples 27, conduits 28 (FIG. 1), conduits 29, conduit 30, deactivator valve 31, and conduit 32 (FIGS. 1, 3, and 4) mounted on nipple 23 which is in communication with chamber 24 of unit 16. The evacuation of motor chambers 25 in the above described manner will result in the downward deflection of diaphragms 33 mounted in said motor units with the corresponding downward movement of stems 34 affixed to said diaphragms. The downward movement of stems 34 will result in the movement of the door locking units 35 to a locked condition, as described in greater detail hereafter.

It will be noted that chamber 17 of unit 16 is in communication with chamber 36 through valve conduits 137 and 138, metering filter 139 and conduit 140. An adjustment screw 141 is provided in the housing of unit 16 to control the density of metering filter 139. It will readily be seen that there will be a lag in the evacuation of chamber 36 with respect to chamber 17. In other words, the evacuation of chamber 17 will be completed before the evacuation of chamber 36. Therefore, there will be a greater vacuum in chamber 17 than there is in chamber 36 when the vehicle engine is first started. Therefore, on the initial starting of the vehicle, the above described evacuation of chamber 17 will result in the unseating of poppet valve 20. However, the continued existence of vacuum within chamber 17 will result in the subsequent evacuation of chamber 36 through the above described path of communication between these chambers. When both chambers 17 and 36 are evacuated to an equal extent, spring 19 will expand and return diaphragm 18 and poppet valve 20 to the position in FIG. 2 to thereby terminate communication between chamber 17 and chamber 24, thus terminating the communication between the engine intake manifold and chambers 25 of door locking motors or servo motors 26.

The evacuated motor chambers 25 will return to a condition wherein they are at atmospheric pressure because the atmosphere will communicate with chamber 24 of unit 16 in communication with motor chambers 25 through filter 37, aperture 52' in the pump housing, aperture 38 in pump piston 39, pump chamber 40 and aperture 41. Since chambers 25 and motors, or servo motors, 26 return to atmospheric pressure after they have been actuated, the door locks may be actuated from within the vehicle without the necessity of overcoming the resistance of the motors 26 which would otherwise be present if chambers 25 remained evacuated. It is to be especially noted that the size of aperture 41 is extremely small so that the flow of air from outside of unit 16 through this aperture will be very small so as not to interfere with the evacuation of chambers 25 of motors, or servo motors, 26 when poppet valve 20 is open.

It is to be further noted that poppet valve 20 may be unseated from time to time while the vehicle is in operation to thereby supply a relocking evacuation to motor units 26. More specifically, assume that the manifold vacuum has decreased for a period of sufficiently long time for an equalization of decreased pressure in both chambers 17 and 36. This may occur during a period of acceleration of the vehicle. When this condition is followed by an increase in manifold vacuum, the above described condition will again be experienced wherein there is a greater vacuum within chamber 17 than there is in chamber 36 and this will be accompanied by an unseating of poppet valve 20, as described in detail above. The advantage of this type of operation is that in the event the vehicle doors were unlocked while the vehicle was at a standstill with the engine in operation, an automatic relocking of the vehicle doors would occur in response to the subsequent reduction in manifold vacuum during acceleration which is followed by an increase in manifold vacuum after the vehicle has attained its normal speed. Because of this type of operation, the vehicle occupants are always assured that the vehicle doors will be locked against intrusion at all times after the vehicle has been placed in operation.

In the event that an operating vehicle is brought to a stop and the vehicle operator desires to unlock the vehicle doors from within the vehicle to permit passengers to enter the vehicle, it is merely necessary for the vehicle operator to depress foot pedal 42 which is mounted on the end of hollow stem 43 of unit 16, mounted on the vehicle floor board 44. Downward movement of stem 43, as guided by sleeve 45, will be accompanied by a downward movement of piston 39 against the bias of spring 46 which is interposed between plate 47 on the underside of piston 39 and the bottom of the housing of unit 16. A gasket 48 is interposed between the top of piston 39 and the bottom end of stem 43. Furthermore, a piston seal 49 is mounted between the outer periphery of piston 39 and the inner wall of chamber 40. The air which is thus trapped within chamber 40 will be compressed and as piston 39 moves downwardly, spring 50 will cause valve 51 to be moved off of its seat to permit this compressed air to pass from chamber 40 into chamber or conduit 24 which is in communication with nipple 23 which, in turn, is in communication with conduit 32 leading to chambers 25 of door locking motors 26. It will readily be appreciated that the positive pressure in the conduits 28 supplied in the above described manner, being of opposite sign than the negative pressure, will cause diaphragms 23 of motors 26 to be deflected upwardly and carry stems 34 upwardly also to effect unlocking of door locking units 35, as more fully described hereafter. Thus it can be seen that the single conduits leading to the door locking motors 26 are used to deflect diaphragms 33 of motors 26 downwardly when chambers 25 are evacuated to thereby effect automatic locking of the vehicle door locks, and that the same single conduits are used to conduct positive pressure, which is of opposite sign with respect to the negative pressure, to chambers 25 to effect unlocking of door locks 35 by deflecting diaphragms 33 upwardly. It will be noted further that whenever the remote unlocking by the use of positive pressure is effected, poppet valve 20 will be on its seat, as shown in FIG. 2, because a condition of equilibrium of pressures in chambers 17 and 36 will have been previously attained. Therefore, there will be no interference between the above described automatic locking and the remote manual unlocking.

When foot pedal 42 is released, spring 46 will expand and return piston 39 to the position shown in FIG. 2. The downward movement of piston 39 will not be impeded by the creation of a vacuous condition above it because this space above piston 39 is in communication with the atmosphere through filter 37 and aperture 52'. Furthermore, whenever piston 39 is moving upwardly, flapper valve 53' will open to permit the air which may possibly tend to be trapped above piston 39, to enter chamber 40. As piston 38 moves upwardly toward its position shown in FIG. 2, a point will be reached wherein head 54' of stem 55' which mounts valve 51 will engage the top of piston 48 and thereby return valve 51 to its seat against the bias of spring 50. It will further be noted that stem 43 is hollow to permit it to travel downwardly about stem 55' when pedal 42 is depressed to move piston 39 downwardly.

The deactivator valve 31 referred to above permits automatic locking of the vehicle doors only when the vehicle driver's seat is occupied. Valve 31 is placed under the driver's seat in such a manner that stem 56' is depressed against the bias of spring 57' when the seat is occupied. The depressing of stem 56' effects the unseating of valve 58' and thereby permits communication between conduit 32 leading from unit 16 and conduit 30 ultimately leading to chambers 25 of motor units 26. When poppet valve 58' is open, poppet valve 59' is closed to prevent conduit 30 from communicating with the atmosphere through valve conduit 59" and filter 58". Communication between conduit 30 leading to motor chambers 25 and the atmosphere through valve conduit 59" and filter 58" is desired when the driver's seat is unoccupied so that there will be no trapping of fluid in conduit 30, which trapping may cause undesired door locking by the door locking motors when the driver leaves the vehicle. In other words, if chambers 25 of motors 26 are still under vacuum when the vehicle operator opens a vehicle door to depart, if there were no venting through filter 58" when the operator moved off of the seat, vacuum would be trapped in chambers 25 and would tend to return the door locks 35 to a locked condition after the door was slammed shut.

Latch lock 35, which is actuated by motor 26, operates in the following manner: A bell crank lever 55 is pivotally mounted on housing 56 by a pin 57. The shaft 58 of a conventional manual door locking and unlocking pin 59 extends through the molding (not shown) of the vehicle door. Shaft 58 is fastened to one end of bell crank lever 60 (FIGS. 5 and 6) which is adapted to pivot about pin 61, the other end of lever 60 fitting within notched recess 62 of link 63. Link 63 is pivotally mounted on pin 64 which extends from flange 65 positioned at a right angle to plate 66 of housing 56. As can be seen from FIG. 6, when shaft 58 is depressed, link 63 will pivot in a counterclockwise direction about its pivot pin 64 to cause the portion 67 of link 63 to move downwardly and carry prong 68 of link 69 downwardly with it, prong 68 fitting within the slotted portion 70 of link 63. It will be noted that a snap-acting spring 71 (FIG. 6) has one end 72 anchored on flange 65 and the other end 73 anchored in link 63. Thus, when manual locking pin 58 is depressed to a locked condition (either manually or by the action of motor 26), it is the snap spring 71 which maintains link 63 in a locked position after the locking force on motor 25 is removed.

Shaft 34 of fluid pressure motor 26 is coupled to shaft 74 (FIGS. 5 and 6) which is, in turn, coupled to bell crank lever 60. Thus the downward movement of motor shaft 34 in response to the existence of vacuum in locking chamber 25 of fluid pressure motor 26 will cause the same action caused by a downward movement of shaft 58, namely, a downward movement of the leg of bell crank lever 60 to thereby pivot link 63 to the position shown in FIGS. 5 and 6, as described in detail above.

After link 69 has been pivoted in a clockwise direction about pin 75 in the above described manner, the movement of pin 76 to the right, as occurs when the outside door handle or button 76' is manipulated, will cause lever 77 to pivot clockwise about pin 78 and cause link 69 (attached to lever 77 by pin 75) to move to the right in FIG. 5. However, the end 78 of link 69 will not engage flange 79 of bell crank lever 55. Thus the manipulation of the outside door handle will be ineffective for unlocking the door lock because the movement of link 69 will not cause lever 55 to pivot in a clockwise direction to free latch 80, as described in greater detail hereafter.

It is only after link 69 has been pivoted about pin 75 in a counterclockwise direction from its position shown in FIG. 5 that the end 78 thereof may engage flange 79 when the outside door handle is manipulated. After end 78 of link 69 engages flange 79 of bell crank lever 55 in response to the movement of pin 76 to the right during a door unlatching operation, lever 55 will pivot in a clockwise direction about pin 57 and the leg 81 (of lever 55) which is within the recessed portion 82 of lever 83 will cause the latter to pivot in a counterclockwise direction about its pivot pin 84 against the bias of spring 85. This, in turn, will cause the tongue 86 of lever 83 to cease engagement with ratchet wheel 87 which is, in turn, coaxially mounted on shaft 88 with the rotary door latch 80. When the above described locking arrangement for the rotary door latch 80 is released through the operation of the above described linkage, latch 80 is free to move relative to the striker plate (not shown) on the door jamb to permit the vehicle door to be pulled to an open position.

From the foregoing description of the lock mechanism illustrated in FIGS. 5 and 6, it can readily be seen that the vehicle door is locked against opening from outside the vehicle whenever the parts are in the position shown in FIG. 5, and that the vehicle door may be opened from outside the vehicle when link 69 has been pivoted in a counterclockwise direction. However, it may be desirable to permit the occupants of the vehicle to open the vehicle doors without first lifting manual unlocking pins 58. To this end, door handles 90 in the vehicle doors may be linked to lever 91 of the lock by means of rod 92 (FIGS. 1 and 5). It will therefore be seen that the manipulation of door handle 90 which causes rod 92 to move to the right will result in the upper end of lever 91 pivoting into the plane of the drawing. The upper end of lever 91 is hooked about end 93 of bell crank lever 95. Therefore, the pivotal movement of the upper end of lever 91 into the plane of the drawing will result in a clockwise pivoting of bell crank lever 55 to thereby cause leg 81 to move the tongue 86 of lever 83 out of engagement with ratchet wheel 87 to thereby permit opening of the vehicle door from within the vehicle without requiring that the manual locking pin 58 be in its lifted position.

It will further be seen that combined pump and automatic selector or control valve unit 16 may be affixed to the floor board of the vehicle by a nut 100 which threadably engages stem 45, the latter fitting through an aperture in the floor board.

In FIGS. 7, 8, and 9 the alternate embodiment of the present invention is shown. In the alternate embodiment both the locking and unlocking is performed manually in contrast to the locking being performed automatically in FIGS. 1–6 described above. In the system shown in FIG. 7, conduit 100 has one end thereof, not shown, coupled to the engine intake manifold and the other end thereof coupled to check valve 101 on vacuum tank 102. As is well understood in the art, during periods of high manifold vacuum tank 102 will be evacuated and the check valve 101 will cause this vacuum to be retained in the tank during periods of low manifold vacuum and when the engine is shut off. The tank 102 is in communication with manual valve 103 through conduit 104 (FIGS. 7 and 8). Valve 103 is mounted on the vehicle dashboard 105 by means of threaded nut 106 and shoulders, not numbered, on the housing of valve 103, as shown in FIG. 8. When it is desired to effect remote locking of the vehicle doors, it is only necessary to depress button 107 of valve 103 which, in turn, moves valve stem 108 downwardly against the bias of spring 109 with the corresponding unseating of poppet valve 110. This permits communication between conduit 104 and conduit 111 through valve 103. Conduit 111 is in communication with door lock actuating motors 26' through conduits 28', 29', and 30'. It will readily be seen, therefore, that whenever valve 103 is opened manually, the evacuation of motors 26', which are of the same construction as motors 26 shown in FIGS. 1–6, will result in the actuation of locks 35' to a locked condition, locks 35' being identical in construction to locks 35 of FIGS. 1–6.

A pump unit 16' is in communication with conduit 30' through conduit 112 (FIGS. 7 and 9). Pump unit 16' is mounted on the floor board of the vehicle as described above relative to pump unit 16 in FIG. 1. After button 107 is released to terminate communication between the vacuum tank and the door locking motors 26', the latter will bleed to atmosphere through filter 37', vent 52", aperture 38' in piston 39' and vent 41'. As stated above relative to FIG. 2, vent 41' is sufficiently large to permit equalization of the inside of motor 26 with the atmosphere but is sufficiently small so as not to interfere with the evacuation of the motor during a locking operation.

Whenever it is desire to effect a remote unlocking of door locks 35', it is only necessary to depress pedal 42' against the bias of spring 46'. This causes the air which is trapped in chamber 40' to be expelled through pump conduit 113 and pump chamber 24' into conduit 112 leading to the motors 26'. The compressed air will cause a reverse movement of the motors 26' than was caused by the vacuum acting thereon. Actually pump 16' of FIG. 9 is identical in all respects to pump 16 of FIG. 2, the only difference between FIGS. 2 and 9 being that the latter does not possess the automatic valving shown in FIG. 2.

It will further be noted that whenever piston 39' is moved downwardly, valve 51' is unseated by the expansion of spring 50' to permit the above described communication to take place. When pedal 42' is released, spring 46' will expand to move piston 39' upwardly. During the upward movement check valve 53" in piston 39 will open to permit the air behind the piston to move into chamber 40'. It will be appreciated of course that when piston 39' is moved downwardly, the sealing effected by gasket 49' and the trapping of air within chamber 40' by the closing of check valve 53" will cause the above described compression to take place. Whenever pump 16' is in the position shown in FIG. 9, valve 51' will prevent communication of conduit 112 with the atmosphere except through vent 41', as described above. (Valve 51 of FIG. 2 operates in the same manner.) It is deemed unnecessary to describe the other details of construction of pump 16' of FIG. 9, it being understood that it operates in the same manner as pump 16 and that the primed numerals in FIG. 9 refer to the same elements of structure as the unprimed numerals in FIG. 2.

It will further be appreciated that valve stem 43' is hollow to permit the upper end 54" of stem 55", which mounts valve 51', to move up into it when pedal 42' is depressed, hollow stem 43' being air-tight to prevent leakage of compressed air due to the loose fit between stem 55" and the aperture in piston 39'.

It is to be especially noted that it is preferable that the foot pump of both FIGS. 2 and 9 is mounted on the floor board of the vehicle for actuation by the right foot of the vehicle operator to thereby preclude actuation of the pump with the left foot while the vehicle is being driven. In other words, the operator must remove his foot from the accelerator in order to actuate the pump. However, it will readily be appreciated that the placing of the pump for actuation by the left foot may also be effected, if desired.

It will thus be seen that the door locking system of the present invention is manifestly capable of achieving the above enumerated objects, and while preferred embodiments of the invention have been disclosed, it will readily be understood that the present invention is not to be limited thereto, but may be otherwise embodied within the scope of the following claims.

What is claimed is:

1. A door locking system for an automotive vehicle comprising a door in said vehicle, door locking means operatively associated with said door, fluid pressure motor means coupled to said door locking means, a source of fluid pressure in said vehicle, coupling means extending between said fluid pressure source and said fluid pressure motor, said coupling means including a single conduit coupled to said motor means, first means operable independently of said source of fluid pressure actuatable by a vehicle operator for effecting communication between said fluid pressure source and said motor means through said single conduit for actuating said motor means in a first direction for locking said vehicle doors and second means operable to provide pressurized fluid of a sign which is opposite to the pressurized fluid at said source for actuating said motor means in a second direction through said single conduit actuated by said vehicle operator to unlock said vehicle doors independently of said fluid pressure source, said second means actuated by said vehicle operator including a pump having piston means operable independently of said source of fluid pressure and means mechanically coupled to said piston means for permitting actuation of said pump independently of said source of fluid pressure by the direct manipulation of said last mentioned means by said vehicle operator.

2. A door locking system for a vehicle comprising a door in said vehicle, door locking means operatively associated with said door, a fluid pressure motor operatively coupled to said door locking means, means in said vehicle for providing fluid pressure, control means for automatically causing said fluid pressure motor to be placed in communication with said fluid pressure source to effect automatic locking of said door locking means in response to the normal operation of said vehicle, a single conduit connection between said control means and said fluid pressure motor through which said communication occurs, means operatively associated with said locking means for retaining it in a locking position after said motor is no longer subjected to fluid pressure from said source, manually actuatable pump means within said vehicle operable independently of said source of fluid pressure to provide a motor energizing pressurized fluid of a sign which is opposite to the pressurized fluid produced by said source and means for preventing said manually actuatable means from interfering with the communication between said fluid pressure source and said fluid pressure motor during said automatic locking and for permitting said manually actuatable means to supply said pressurized fluid of an opposite sign to said fluid pressure motor means through said single conduit means for unlocking said door locking means, said manually actuatable pump means being actuatable by said vehicle operator and including a pump operable independently of said source of fluid pressure and said pump including piston means and means mechanically coupled to said piston means for permitting actuation of said pump independently of said source of fluid pressure by the direct manipulation of said last mentioned means by said vehicle operator.

3. In combination with a motor vehicle having a door with a latch lock mechanism and a servo motor connected to the latch locking member thereof for locking the door through the latch, said motor vehicle having an internal combustion engine with an intake manifold providing a source of suction, a directly manipulated pump operable independently of said source of suction and serving as a source of positive pressure, piston means in said pump, means adapted to be directly manipulated by a vehicle operator and in direct mechanical engagement with said piston means for moving said piston means and thereby operating the pump independently of said source of suction to provide said positive pressure, a power line for establishing communication between the suction source and the servo motor to actuate the latch locking member for locking the door, said pump being connected to said power line to pressurize the servo motor for reversing the latter to unlock the door independently of said source of suction, and valve means to close off the suction source from the power line when the pump is operative.

References Cited in the file of this patent

UNITED STATES PATENTS

| | | |
|---|---|---|
| 1,864,468 | Pieper | June 21, 1932 |
| 2,103,702 | Tibbetts | Dec. 28, 1937 |
| 2,169,268 | McCullough | Aug. 15, 1939 |
| 2,198,862 | Chesler | Apr. 30, 1940 |
| 2,782,028 | Almond | Feb. 19, 1957 |
| 2,799,154 | Beal | July 16, 1957 |
| 2,936,843 | Adams et al. | May 17, 1960 |
| 2,974,742 | Tyler | Mar. 14, 1961 |